United States Patent
Wright

(10) Patent No.: US 8,602,675 B2
(45) Date of Patent: Dec. 10, 2013

(54) ASSEMBLY COMPRISING FIRST AND SECOND COMPONENTS

(75) Inventor: Christopher Wright, Bristol (GB)

(73) Assignee: Rolls-Royce PLC, London (GB)

(*) Notice: Subject to any disclaimer, the term of this patent is extended or adjusted under 35 U.S.C. 154(b) by 245 days.

(21) Appl. No.: 12/585,075

(22) Filed: Sep. 2, 2009

(65) Prior Publication Data

US 2010/0111594 A1 May 6, 2010

(30) Foreign Application Priority Data

Nov. 5, 2008 (GB) .................................. 0820230.1

(51) Int. Cl.
  *B25G 3/00* (2006.01)
  *E21B 17/043* (2006.01)
  *F16D 1/00* (2006.01)

(52) U.S. Cl.
  USPC ........... 403/286; 403/280; 403/282; 403/291; 403/292; 403/293; 464/155

(58) Field of Classification Search
  USPC ......... 403/280, 282, 286, 291, 292, 293, 294, 403/298; 411/351, 452, 508; 464/52, 88, 464/97, 155, 156; 415/216.1; 416/244 A, 416/244 R
  See application file for complete search history.

(56) References Cited

U.S. PATENT DOCUMENTS

| | | | | |
|---|---|---|---|---|
| 280,186 A * | 6/1883 | Johnston | ...................... | 403/283 |
| 1,354,549 A * | 10/1920 | Gilmer | ......................... | 403/280 |
| 1,741,720 A * | 12/1929 | Jolley | ........................... | 403/286 |
| 2,384,918 A * | 9/1945 | Addison | ....................... | 411/548 |
| 2,865,290 A * | 12/1958 | Bonsper | ........................ | 403/281 |
| 3,352,191 A * | 11/1967 | Crawford | ...................... | 411/456 |
| 3,494,640 A * | 2/1970 | Brown et al. | .................. | 285/115 |
| 3,550,395 A * | 12/1970 | Herzog et al. | .................. | 464/81 |
| 3,667,341 A * | 6/1972 | Kaplan | ......................... | 411/60.1 |
| 3,772,767 A * | 11/1973 | Johnson | ......................... | 29/507 |
| 3,838,928 A * | 10/1974 | Blaurock et al. | .............. | 403/372 |
| 4,093,389 A * | 6/1978 | Wibrow | ......................... | 403/280 |
| 4,474,493 A * | 10/1984 | Welch | ......................... | 403/408.1 |
| 4,682,505 A * | 7/1987 | Morissette et al. | ...... | 73/862.328 |
| 4,828,423 A * | 5/1989 | Cramer et al. | ................ | 403/372 |
| 5,328,408 A * | 7/1994 | Wolf et al. | ..................... | 464/180 |
| 5,454,661 A * | 10/1995 | Litvin et al. | .................. | 403/298 |
| 6,411,472 B1 * | 6/2002 | Allsup | ........................ | 360/265.7 |
| 6,991,397 B2 * | 1/2006 | Welch | .......................... | 403/297 |
| 7,611,303 B2 * | 11/2009 | Hanrahan et al. | ............. | 403/372 |
| 2008/0043375 A1 * | 2/2008 | Hanrahan et al. | .......... | 360/265.6 |

FOREIGN PATENT DOCUMENTS

| | | | | |
|---|---|---|---|---|
| GB | 695183 | | 8/1953 | |
| GB | 920385 | | 3/1963 | |
| GB | 1 386 738 | | 3/1975 | |
| JP | 2007239955 A | * | 9/2007 | ............. F16C 19/36 |

* cited by examiner

*Primary Examiner* — Gregory Binda
*Assistant Examiner* — Nahid Amiri
(74) *Attorney, Agent, or Firm* — Oliff and Berridge, PLC

(57) ABSTRACT

Components such as turbine shafts are maintained coaxial with each other by a coupling ring. The coupling ring includes a body which is cylindrical when unstressed, and which has two arrays of projections each array engaging a respective cylindrical surface of recesses in the components. The body is flexible, and so is resiliently deformed by contact between the projections and the respective cylindrical surface. The projections of the two arrays are angularly out of phase with each other.

17 Claims, 2 Drawing Sheets ial surface. Because the radial projections
of the respective arrays are angularly offset from each other,
the radial deformation of the coupling ring will be different at
each array. The distortion caused on the coupling may cause
the projection to have variable interference along its length.
The contact surface may be configured (i.e. profiled) to ensure
acceptable contact along its length to ensure stability of the
coupling and shaft system.

At least one of the components may comprise a shaft,
which may have an internal cylindrical recess providing the
respective cylindrical surface. In one embodiment, both of the
components comprise shafts, the shafts being supported in
coaxial alignment with each other by the coupling ring. The
components may comprise aligned rotational components,
such as turbine shafts of a gas turbine engine.

The present invention also provides a coupling ring for an
assembly as defined above, the coupling ring being radially
resilient and having first and second arrays of circumferentially spaced radial projections, the projections of the first
array being angularly offset with respect to the projections of
the second array.

BRIEF DESCRIPTION OF THE DRAWINGS

For a better understanding of the present invention, and to
show more clearly how it may be carried into effect, reference
will now be made, by way of example, to the accompanying
drawings, in which:—

DETAILED DESCRIPTION OF EMBODIMENTS

Figure 1:
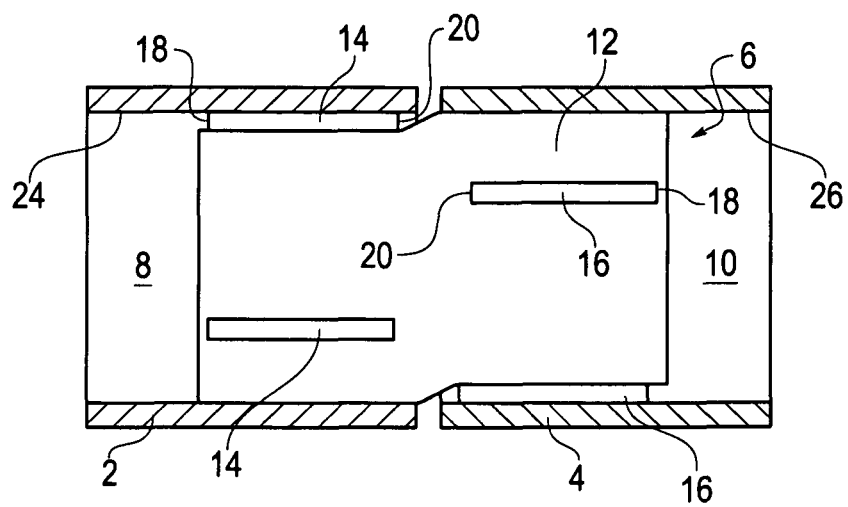
FIG. 1 is a schematic sectional view of an assembly comprising first and second shafts and a coupling ring extending between them.
Figure 5:
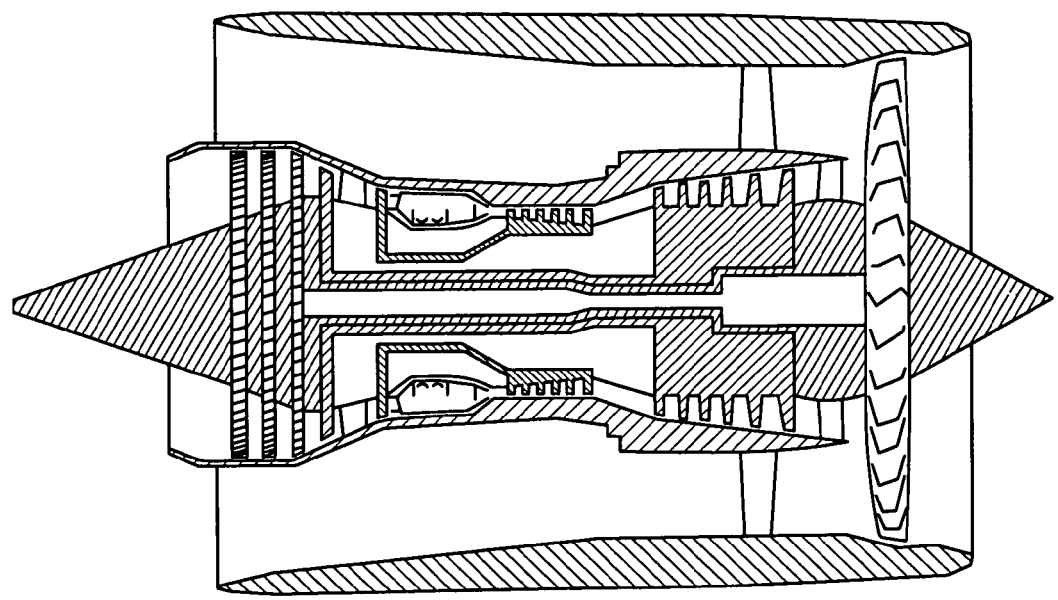
FIG. 5 illustrates a gas turbine engine.

FIG. 1 shows first and second components in the form of
turbine shafts 2, 4 of a gas turbine engine (FIG. 5). The shafts
2, 4 are disposed axially end-to-end, and are interconnected,
and axially aligned, by a coupling ring 6. The coupling ring 6
is received within recesses 8, 10 in the shafts 2, 4. Each recess
8, 10 may be constituted by the hollow interior of the respective shaft 2, 4. The coupling ring 6 comprises a body 12 which
is cylindrical (ie of circular cross-section) in the unstressed
condition of the coupling ring 6. As will be appreciated from
FIG. 2, the body 12 has a relatively thin wall, and the wall
thickness, in conjunction with the material from which the
coupling ring 6 is made, provides the coupling ring 6 with a
degree of radial resilience. The coupling ring may, for
example, be made from a high-temperature aerospace alloy.

The body 12 is provided with two arrays of radial projections 14, 16. In the illustrated embodiment, each array comprises three angularly equally spaced projections 14, 16, and
each projection 14, 16 is in the form of an axially extending
rib. Each rib 14 extends from a first end 18 at or close to an
axial end face of the body 12 to a second end 20 approaching
a position midway between the end faces of the body 12.
Consequently, there is an axial spacing between the radial
planes containing the respective second ends 20 of the respective arrays of projections 14 and 16.

Figure 2:
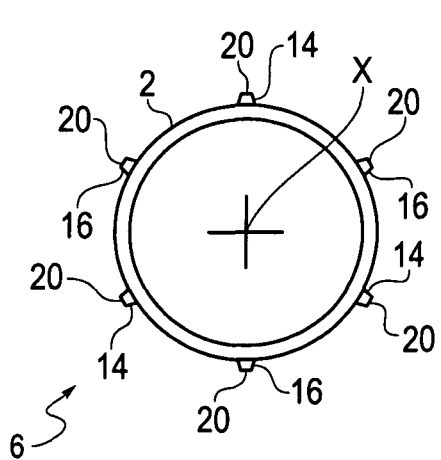
FIG. 2 is an end view of the coupling ring of FIG. 1 when unstressed.

Also, as can be appreciated from FIG. 2, the projections 14
of one of the arrays are positioned angularly out of phase with

ASSEMBLY COMPRISING FIRST AND SECOND COMPONENTS

BACKGROUND

This invention relates to an assembly comprising first and
second components which are interconnected by a coupling
ring, and is particularly, although not exclusively, concerned
with such an assembly in which the first and second components are shafts such as turbine shafts of a gas turbine engine.

Rotational components, such as turbine shafts, of a gas
turbine engine rotate in operation at very high speeds. Consequently, when two such components are axially interconnected, it is important for them to be in precise axial alignment to ensure good and repeatable dynamic (rotating)
balance across the joint. It is also useful for it to be possible to
separate and reassemble the joint for, for example, servicing
and maintenance purposes.

SUMMARY

Known joints for this purpose, such as Curvic® couplings,
Hirth couplings and spigot joints are often expensive to
manufacture and can become misaligned when assembled
and in use, for example as a result of distortion.

According to the present invention there is provided an
assembly comprising first and second components disposed
axially end-to-end and a radially resilient coupling ring which
engages cylindrical surfaces of the components, the coupling
ring having first and second arrays of circumferentially
spaced radial projections which contact the cylindrical surfaces of the first and second components, the projections of
the first array being angularly offset with respect to the projections of the second array.

Embodiments in accordance with the present invention can
be manufactured relatively inexpensively, yet provide accurate and repeatable alignment of the two components.

At least one of the first and second arrays may comprise at
least three of the radial projections. More than three projections may be employed in each array.

The angular offset between the radial projections of the two
arrays may be such that each radial projection of one of the
arrays is situated angularly midway between adjacent projections of the other array.

The projections of at least one of the arrays may comprise
ribs which extend in the axial direction with respect to the
central axis of the coupling ring. In one embodiment, all of the
projections comprise ribs. The first and second arrays of
projections may be axially spaced apart from each other along
the central axis of the coupling ring, so that there is a region
of the coupling ring between the two arrays which is not
provided with any radial projections.

The radial projections of at least one of the first and second
arrays may project outwardly from an external circumferential surface of the coupling ring, or, in an alternative embodiment, may project inwardly from an internal circumferential
surface.

Each radial projection may be provided with a contact
surface contacting the cylindrical surface of the respective
component. The contact surface may be profiled to match the
respective cylindrical surface. The contact surfaces may thus
be configured to prevent cutting of the respective cylindrical
surfaces by the radial projections. Instead, cooperation
between the coupling ring and the respective components
results in radial deformation of the coupling ring.

Thus, the coupling ring may be circular when unstressed,
but radially deformed from the unstressed circular configuthe projections 16 of the other array. In the embodiment shown in the drawings, the projections 14, 16 of each array are situated angularly midway between the projections 16, 14 of the other array.

In the embodiment shown in FIG. 2, each projection 14, 16 extends from the body 12 in a radial direction and tapers in the radially outward direction. Each projection 14, 16 terminates at an end face 22 which is generally flat, or may be profiled to conform to the surface 24, 26 of the recess 8, 10 respectively. The surfaces 24, 26 are cylindrical with a circular cross-section in the embodiment shown in the drawings, but non-circular cylindrical profiles are also possible. The end surfaces 20 lie on a circle having a diameter slightly larger than the cylindrical surfaces 24, 26.

In order to assembly the turbine shafts 2 and 4 with the coupling ring 6, one end of the coupling ring 6 is inserted into the recess 8 of one of the turbine shafts 2, while the other end of the coupling ring 6 is inserted into the recess 10 of the other turbine shaft 4, as shown in FIG. 1.

Figure 3:
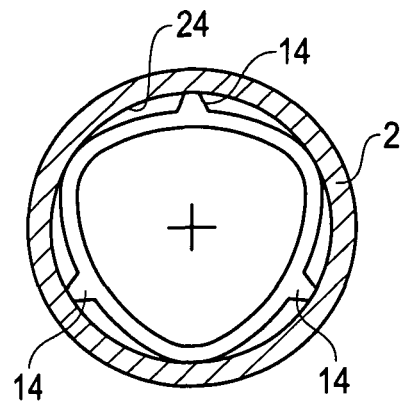
FIG. 3 is an end view of the assembly of FIG. 1.

As shown in FIG. 3, the contact between the projections 14 and the cylindrical surface 24 causes the coupling ring 6, in the region within the recess 8, to be radially stressed, and deformed into a generally triangular configuration. Because there are three projections 14, the central axis of the deformed coupling ring 6, indicated at X in FIG. 3, remains coincident with the central axis of the turbine shaft 2.

The same deformation occurs at the other end of the coupling ring 6, situated within the recess 10. However, because the projections 16 are angularly out of phase with the projections 14, the deformed triangular configuration of the coupling 6 is offset by 60° from the configuration shown in FIG. 3 for the projections 14. However, the central axis X of the coupling ring 6 is again coincident with the axial centreline of the turbine shaft 4. Consequently, the turbine shafts 2 and 4 are maintained coaxial with each other.

The flexibility of the body 12 enables the coupling ring 6 to be deformed sufficiently for it to be received in recesses 8, 10 having a range of internal diameters. Consequently, the recesses 8, 10 (or internal diameters of the shafts 2, 4) do not need to be formed with high precision since the coupling ring 6 will fit a limited range of bore diameters. The coupling ring 6 will accommodate a wider tolerance range of shaft bores diameter than a conventional precision coupling. Also, the coupling 6 is relatively easy to manufacture, without requiring high precision, and can be formed by relatively simple turning and milling operations.

The flat or slightly arcuate end surfaces 20 of the projections 14, 16 ensure that the projections 14, 16 locate against the cylindrical surfaces 24, 26 without cutting into them. Optionally, the projections 14, 16 have a chamfered lead-in so that the coupling ring 6 can be easily entered into each of the recesses 8, 10. The coupling ring 6 consequently does not transmit torque between the turbine shafts 2 and 4, and separate measures need to be provided to enable such torque transmission. For example, the turbine shafts 2, 4 can be provided with inter-engaging teeth or dogs which are sufficiently tolerant of radial positioning between the turbine shafts 2 and 4 to accept the centralising effect of the coupling ring 6.

The coupling ring 6 has an interference fit between the first array of radial projections 14 and cylindrical surface 24. The interference causes the coupling ring 6 to distort such that the second array of radial projections 16 splays outward. The splay enables the radial projections 16 to fit within a second shaft 4 that may be a larger diameter than the first shaft 2.

In one embodiment, for a coupling ring 6 made from a conventional spring steel, the wall thickness of the coupling ring 6 is approximately 7-8% of the bore diameter and the outside diameter of the coupling ring 6 is substantially 1% greater than the diameter of the engaging internal cylindrical surfaces 24, 26.

While the presence of three projections 14, 16 in each array provides adequate centering of the coupling ring 6 within each recess 8, 10, it will be appreciated that more than three projections may be provided in each array. Also, it is not essential for the cylindrical surfaces 24, 26 to have the same nominal diameter, since the flexibility of the coupling ring 6 will tolerate diameter differences while maintaining the required coaxial relationship between the turbine shafts 2 and 4.

Figure 4:
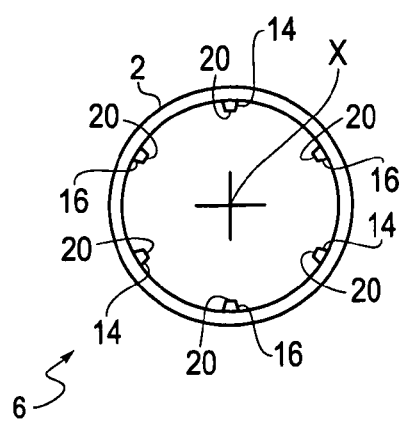
FIG. 4 is an end view of the coupling ring when unstressed.

Although the embodiment shown in the drawings utilises a coupling ring 6 having radially outwardly extending projections 14, 16 engaging internal cylindrical surfaces 24, 26, an alternative embodiment employs radially inwardly directed projections 14, 16 (FIG. 4) engaging external cylindrical surfaces of shafts or other components. Also, while the invention has been described in the context of turbine shafts 2, 4 of a gas turbine engine, it will be appreciated that the invention is applicable to other situations where component alignment is required.

The invention claimed is:

1. An assembly comprising:
   first and second components disposed axially end-to-end; and
   a radially resilient coupling ring which engages cylindrical surfaces of the components,
   the coupling ring having a first plurality of circumferentially spaced radial projections at a first end of the coupling ring and a second plurality of circumferentially spaced radial projections at a second end of the coupling ring, and no other projection at the first end and no other projection at the second end, the first plurality of circumferentially spaced radial projections and the second plurality of circumferentially spaced radial projections contact the cylindrical surfaces of the first and second components, and
   all of the first plurality of circumferentially spaced radial projections at the first end and all of the second plurality of circumferentially spaced radial projections at the second end are arranged such that none of the projections of the first plurality of circumferentially spaced radial projections being angularly aligned with any of the projections of the second plurality of circumferentially spaced radial projections.

2. An assembly as claimed in claim 1, in which at least one of the first plurality of circumferentially spaced radial projections and the second plurality of circumferentially spaced radial projections comprises at least three of the radial projections.

3. An assembly as claimed in claim 1, in which each radial projection of one of the first plurality of circumferentially spaced radial projections or the second plurality of circumferentially spaced radial projections is situated angularly midway between adjacent projections of the other of the first plurality of circumferentially spaced radial projections or the second plurality of circumferentially spaced radial projections.

4. An assembly as claimed in claim 1, in which the projections of at least one of the first plurality of circumferentially spaced radial projections and the second plurality of circumferentially spaced radial projections comprise ribs which extend in the axial direction with respect to the central axis of the coupling ring.

5. An assembly as claimed in claim 1, in which the first plurality of circumferentially spaced radial projections and the second plurality of circumferentially spaced radial projections are axially spaced apart from each other along the central axis of the coupling ring.

6. An assembly as claimed in claim 1, in which the radial projections of at least one of the first plurality of circumferentially spaced radial projections and the second plurality of circumferentially spaced radial projections project outwardly from a circumferential surface of the coupling ring.

7. An assembly as claimed in claim 1, in which the radial projections of the at least one of the first plurality of circumferentially spaced radial projections and the second plurality of circumferentially spaced radial projections project inwardly from a circumferential surface of the coupling ring.

8. An assembly as claimed in claim 1, in which each radial projection is provided with a contact surface contacting the respective cylindrical surface.

9. An assembly as claimed in claim 8, in which each contact surface is profiled to match the respective cylindrical surface.

10. An assembly as claimed in claim 1, in which the coupling ring is substantially circular when unstressed.

11. An assembly as claimed in claim 10, in which the coupling ring is radially deformed from the unstressed circular configuration by contact between the first plurality of circumferentially spaced radial projections and the second plurality of circumferentially spaced radial projections and the respective cylindrical surfaces.

12. An assembly as claimed in claim 1, in which at least one of the components comprises a shaft.

13. An assembly as claimed in claim 12, in which the shaft, or at least one of the shafts, has an internal cylindrical recess providing the respective cylindrical surface.

14. An assembly as claimed in claim 12, in which both of the components comprise shafts, the shafts being supported in coaxial alignment by the coupling ring.

15. A gas turbine engine comprising an assembly in accordance with claim 1.

16. A gas turbine engine as claimed in claim 15, in which the rotational components comprise turbine shafts.

17. An assembly as claimed in claim 1, in which each of the first plurality of circumferentially spaced radial projections and the second plurality of circumferentially spaced radial projections terminates at an end face that is generally flat or profiled to conform to the surface of the body.

\* \* \* \* \*